US011981006B2

(12) United States Patent
Yan et al.

(10) Patent No.: US 11,981,006 B2
(45) Date of Patent: May 14, 2024

(54) NAIL GUN PUNCHING NEEDLE CLUTCH MECHANISM

(71) Applicant: Hangzhou Kelong Electric Devices Co., Ltd., Hangzhou (CN)

(72) Inventors: Guomin Yan, Hangzhou (CN); Wenping Liu, Hangzhou (CN)

(73) Assignee: Hangzhou Kelong Electric Devices Co., Ltd., Hangzhou (CN)

( * ) Notice: Subject to any disclaimer, the term of this patent is extended or adjusted under 35 U.S.C. 154(b) by 0 days.

(21) Appl. No.: 18/255,111

(22) PCT Filed: May 12, 2022

(86) PCT No.: PCT/CN2022/092394

§ 371 (c)(1),
(2) Date: May 31, 2023

(87) PCT Pub. No.: WO2023/103281

PCT Pub. Date: Jun. 15, 2023

(65) Prior Publication Data

US 2024/0033889 A1 Feb. 1, 2024

(30) Foreign Application Priority Data

May 7, 2022 (CN) ......................... 202210489278.4

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .. B25C 1/046; B25C 1/06; B25C 1/04; B25C 1/041; B25C 1/042; B25C 1/043; B25C 1/008; B25C 1/047
See application file for complete search history.

(56) References Cited

U.S. PATENT DOCUMENTS

2017/0266796 A1 9/2017 Leimbach et al.
2018/0126528 A1* 5/2018 Pomeroy .................. B25C 5/13
2021/0237240 A1 8/2021 Feng et al.
2021/0323131 A1 10/2021 Hao et al.

* cited by examiner

*Primary Examiner* — Veronica Martin
(74) *Attorney, Agent, or Firm* — PROI Intellectual Property US; Klaus Michael Schmid

(57) ABSTRACT

A nail gun punching needle clutch mechanism includes a punching needle driving cam, an inductive optocoupler, a torsion spring, a clutch pawl, and a punching needle. A motor connected to a driving camshaft through a gearbox. A fixed end of the punching needle is fixed on a piston of an accumulator; a movable end of the punching needle is disposed inside the assemble frame body in a sliding manner. The punching needle driving cam and the clutch pawl are disposed on two sides of the punching needle respectively. The punching needle driving cam engages with punching needle teeth through cam pins to drive the punching needle to slide between an initial position and an energy storage position. An inductive optocoupler blocking edge is disposed at an edge of a side, facing the clutch pawl, of the punching needle, and the inductive optocoupler controls start and stop of the motor.

9 Claims, 15 Drawing Sheets

NAIL GUN PUNCHING NEEDLE CLUTCH MECHANISM

FIELD OF THE INVENTION

The present invention relates to the field of electric tools, in particular to a nail gun punching needle clutch mechanism.

BACKGROUND OF THE INVENTION

In the nail gun market, nail guns are not only professional tools, but also suitable for simple decoration use by ordinary families and individuals. During use, enough potential energy is accumulated for a punching needle to ensure accurate movement of the punching needle therein, and then the punching needle is released and instantly strikes a nail into an object such as a board without obstacles. In addition, whether this process can be accurately circulated after a trigger is pulled each time is the key to whether a nail gun can work normally.

SUMMARY OF THE INVENTION

The objective of the present invention is to overcome the shortcomings of existing technologies and provide a nail gun punching needle clutch mechanism, which ensures accurate movement of a punching needle in enough accumulated potential energy, and ensures that the punching needle is released after energy storage to strike a nail into an object such as a board without obstacles.

The purpose of the present invention is achieved through the following technical solutions: a nail gun punching needle clutch mechanism disposed inside a nail gun shell on which a nail clip, an assembly frame body, and an accumulator are fixed, the nail clip being disposed below the assembly frame body to feed nails into the assembly frame body, and the accumulator being disposed behind the assembly frame body, the clutch mechanism comprises a punching needle driving cam, an inductive optocoupler, a torsion spring, a clutch pawl, and a punching needle; a motor is disposed in the nail gun shell, the motor is triggered to rotate by a trigger on the nail gun shell, the motor is connected to a driving camshaft through a gearbox, and the camshaft is used to drive the punching needle driving cam to rotate; a fixed end of the punching needle is fixed on a piston of the accumulator, and a movable end of the punching needle is disposed inside the assembly frame body in a sliding manner to strike a nail inside the assembly frame body, so that the nail is shot out from a nail outlet of the assembly frame body; the punching needle driving cam and the clutch pawl are disposed on two sides of the punching needle separately; punching needle teeth are disposed at an edge of a side, facing the punching needle driving cam, of the punching needle, a plurality of cam pins are disposed on the punching needle driving cam, and the punching needle driving cam engages with the punching needle teeth through the cam pins to drive the punching needle to slide between an initial position and an energy storage position; an inductive optocoupler blocking edge is disposed at an edge of a side, facing the clutch pawl, of the punching needle to selectively block the inductive optocoupler disposed next to the clutch pawl, and the inductive optocoupler controls start and stop of the motor through electrical signals; the torsion spring is used to twist the clutch pawl, so that the clutch pawl slides along the inductive optocoupler blocking edge; and a notch is formed on the inductive optocoupler blocking edge to fit and clamp the clutch pawl.

As a further technical solution, the assembly frame body comprises an upper plate and a lower plate, and the punching needle is disposed between the upper plate and the lower plate in a sliding manner As a further technical solution, a boss is disposed on an upper surface of the lower plate to match a groove disposed on a lower surface of the punching needle, and the punching needle slides along the boss and is guided; a nail inlet is disposed on a lower surface of the lower plate, and the nail inlet penetrates the boss, so that the nail at a top of the nail clip enters the assembly frame body along the nail inlet.

As a further technical solution, when the punching needle slides to a middle energy storage position between the initial position and the energy storage position, the cam pins of the punching needle driving cam happen to disengage from the punching needle teeth, and the clutch pawl is just clipped into the notch to limit the movement of the punching needle towards its active end.

As a further technical solution, when the inductive optocoupler blocking edge completely leaves the inductive optocoupler, the inductive optocoupler sends a signal to control the motor to stop rotating.

As a further technical solution, a left jump platform is disposed on the inductive optocoupler blocking edge on a side, close to the movable end, of the notch, a right jump platform is disposed on the inductive optocoupler blocking edge on a side, close to the fixed end of the notch, and a height of the left jump platform is greater than that of the right jump platform.

As a further technical solution, when the clutch pawl moves away from the left jump platform towards the notch, the clutch pawl crosses the notch in an arc trajectory and lands on the right jump platform.

As a further technical solution, the accumulator is a spring or compressed gas.

As a further technical solution, the camshaft is sleeved with a one-way bearing to ensure that the punching needle driving cam rotates in one direction.

Beneficial effects of the present invention are as follows: the punching needle is guided through the boss and the groove during movement, so as to ensure accurate movement of the punching needle in enough accumulated potential energy, and to ensure that the punching needle is released after energy storage to strike a nail into an object such as a board without obstacles.

Figure 1:
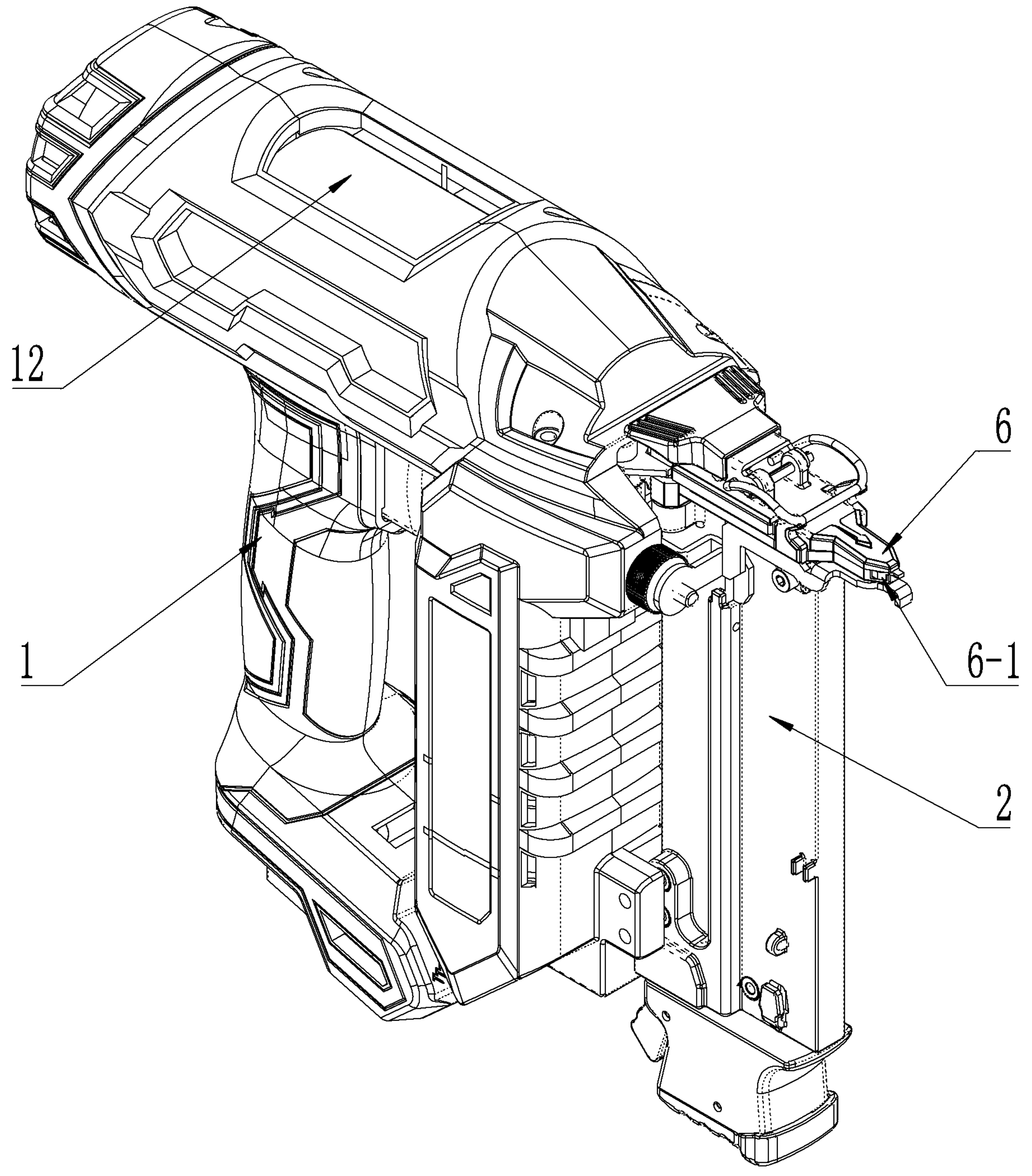
FIG. 1 is a schematic diagram of a three-dimensional structure of the present invention.

Description of reference numerals: nail gun shell 1, nail clip 2, motor 3, gearbox 4, one-way bearing 5, assembly frame body 6, nail outlet 6-1, upper plate 6-2, lower plate 6-3, boss 6-4, nail inlet 6-5, needle driving cam 7, inductive optocoupler 8, torsion spring 9, clutch pawl 10, punching needle 11, fixed end 11-1, movable end 11-2, punching needle tooth 11-3, inductive optocoupler blocking edge 11-4, notch 11-5, groove 11-6, left jump platform 11-7, right jump platform 11-8, accumulator 12, camshaft 13, piston 14, cam pin 15, and trigger 16.

DETAILED DESCRIPTION OF THE EMBODIMENTS

The present invention will be described in detail with reference to the accompanying drawings and embodiments.

Figure 2:
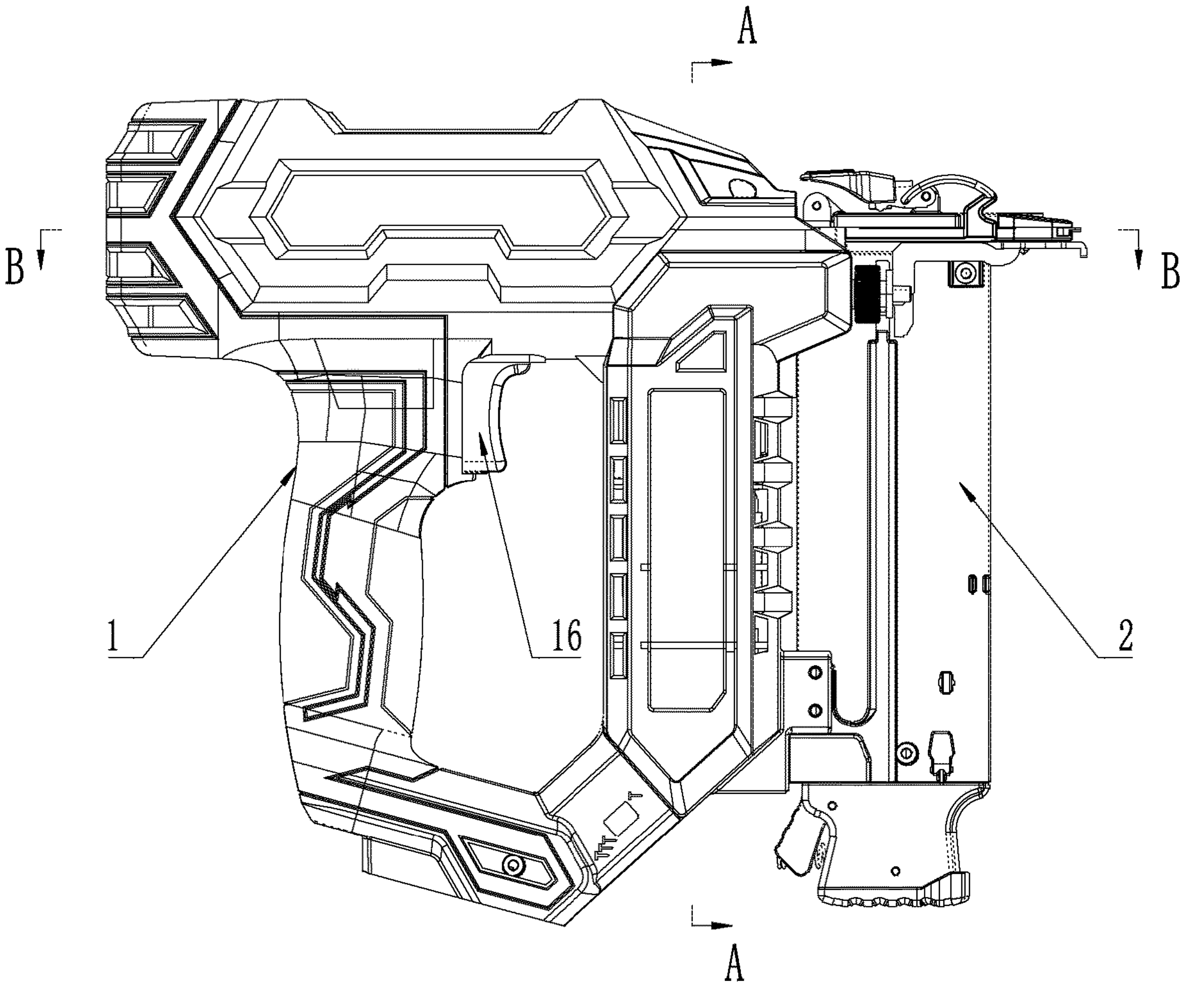
FIG. 2 is a schematic diagram of a front-view structure of the present invention.
Figure 3:
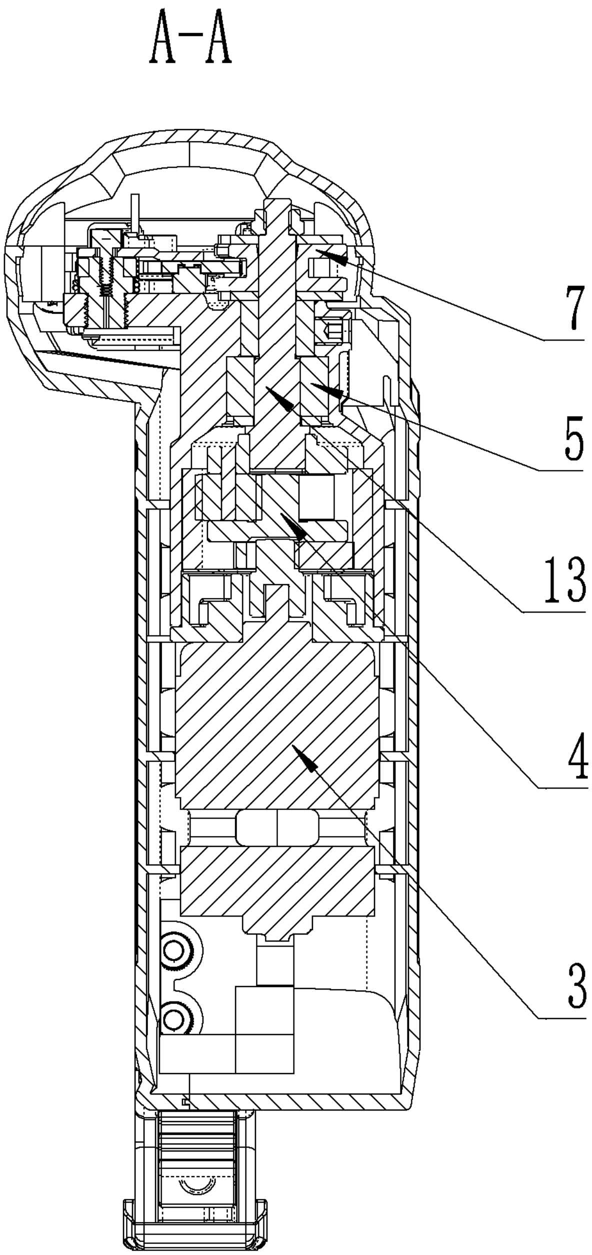
FIG. 3 is a cross-sectional view taken along line A-A in FIG. 2.

Embodiment: As shown in FIGS. 1-20, a nail gun punching needle clutch mechanism is disposed inside a nail gun shell 1. A nail clip 2, an assembly frame body 6, and an accumulator 12 are fixed on the nail gun shell 1. With reference to FIGS. 1 and 2, the nail clip 2 is disposed below the assembly frame body 6 to feed nails into the assembly frame body 6, and the accumulator 12 is disposed behind the assembly frame body 6. The clutch mechanism includes a punching needle driving cam 7, an inductive optocoupler 8, a torsion spring 9, a clutch pawl 10, and a punching needle 11. With reference to FIGS. 2 and 3, a motor 3 is disposed in the nail gun shell 1, the motor 3 is triggered to rotate by a trigger 16 on the nail gun shell 1, the motor 3 is connected to a driving camshaft 13 through a gearbox 4, and the camshaft 13 is used to drive the punching needle driving cam 7 to rotate. Preferably, the camshaft 13 is sleeved with a one-way bearing 5 (or a one-way clutch) to ensure that the punching needle driving cam 7 can rotate only in one direction (counterclockwise in FIG. 4).

Figure 4:
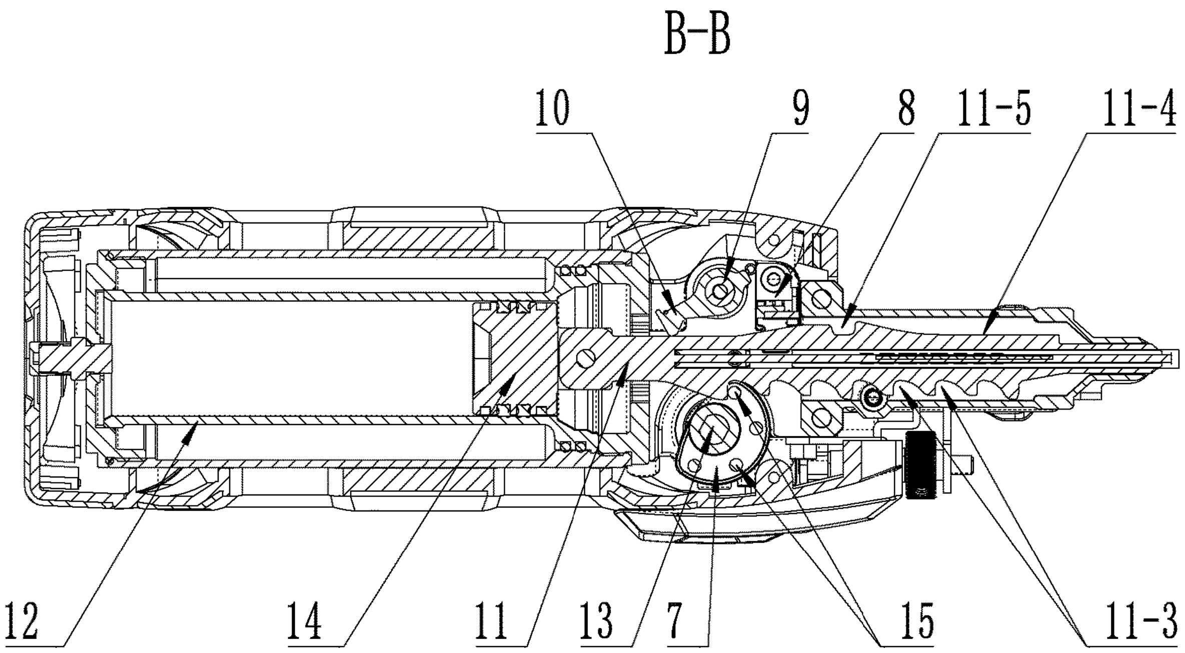
FIG. 4 is a cross-sectional view taken along line B-B in FIG. 2.
Figure 5:
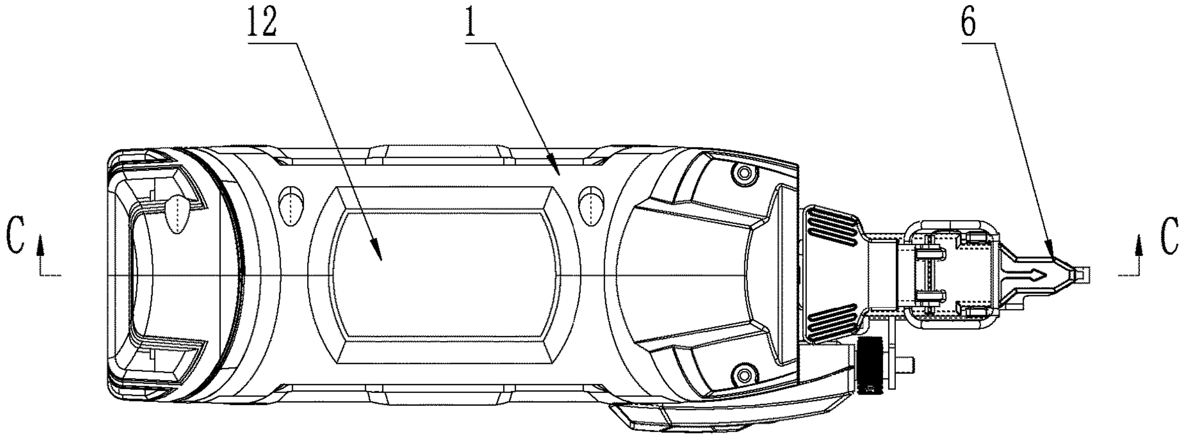
FIG. 5 is a schematic diagram of an overlooked structure of the present invention.
Figure 6:
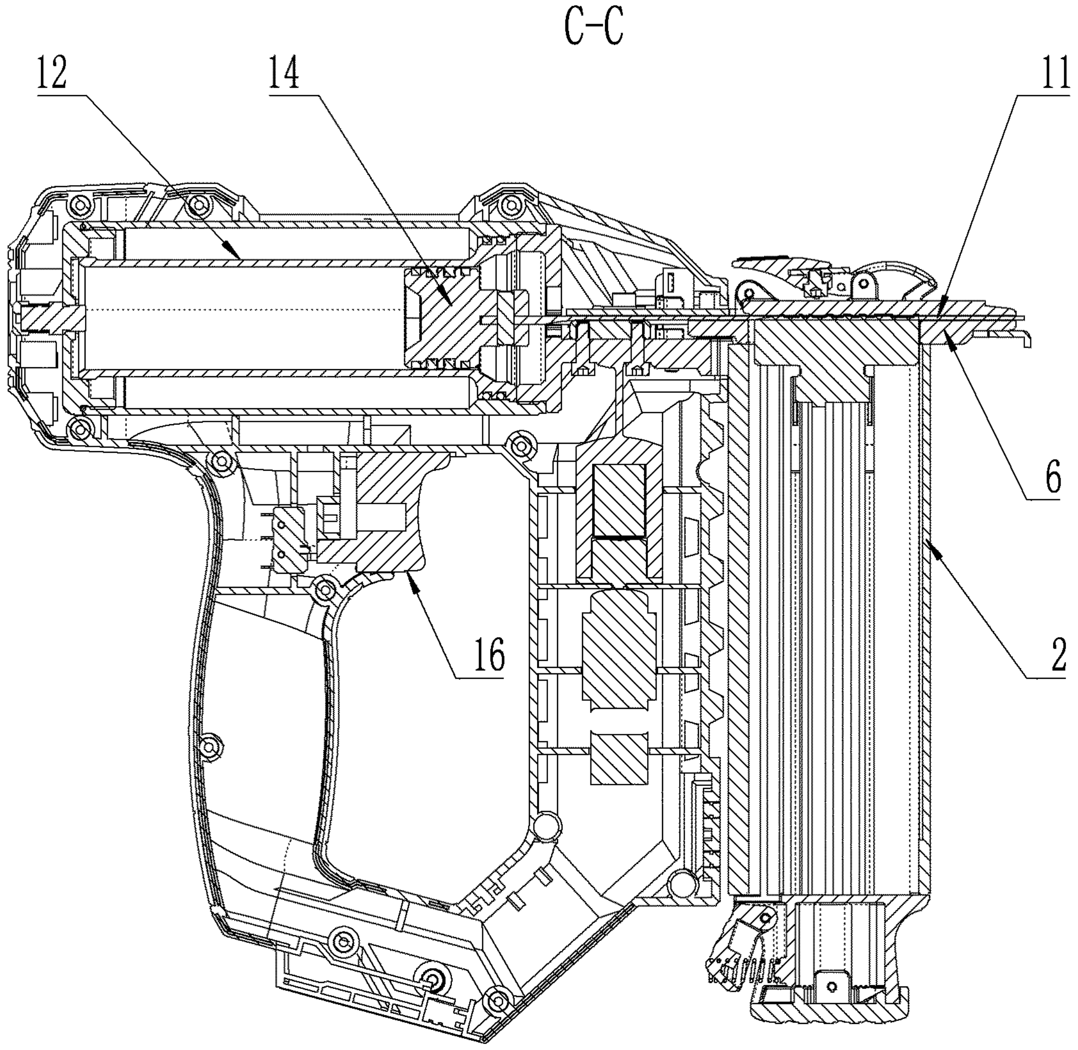
FIG. 6 is a cross-sectional view taken along line C-C in FIG. 5.
Figure 7:
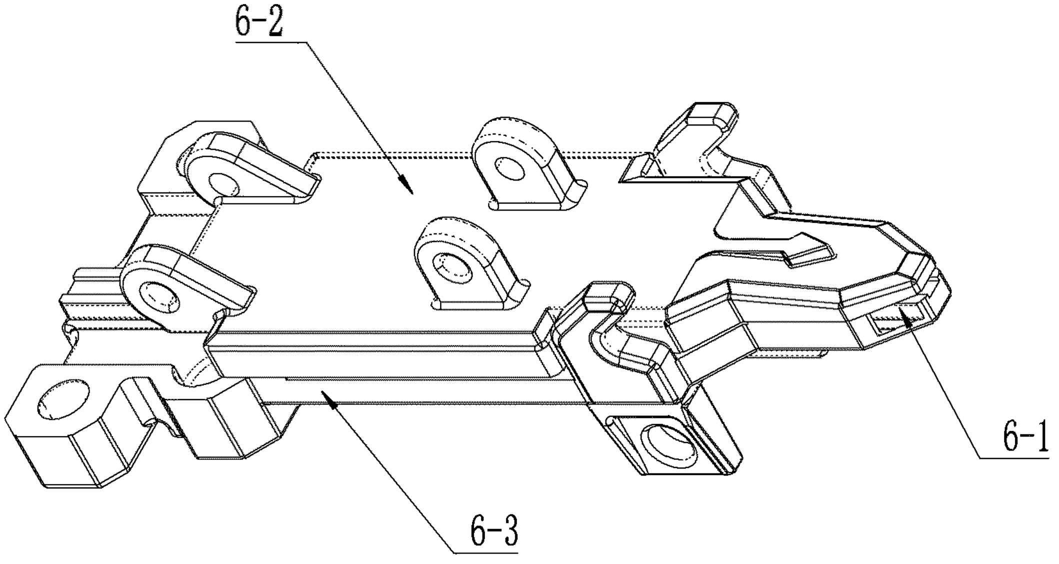
FIG. 7 is a schematic structural diagram 1 of an assembly frame body in the present invention.
Figure 8:
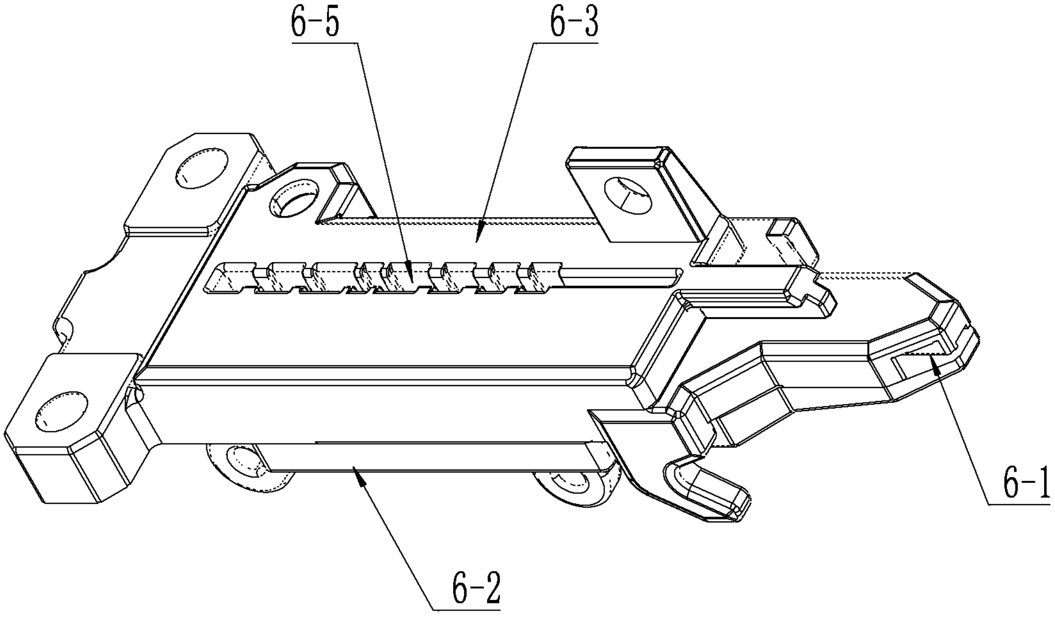
FIG. 8 is a schematic structural diagram 2 of the assembly frame body in the present invention.
Figure 9:
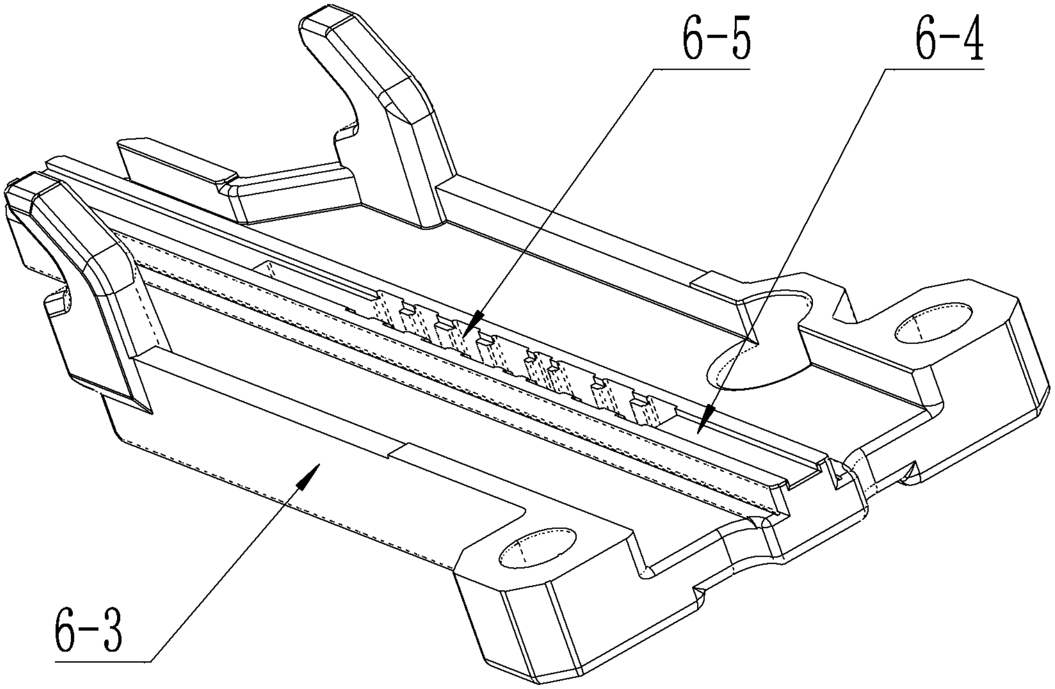
FIG. 9 is a schematic structural diagram of a lower plate in the present invention.
Figure 10:
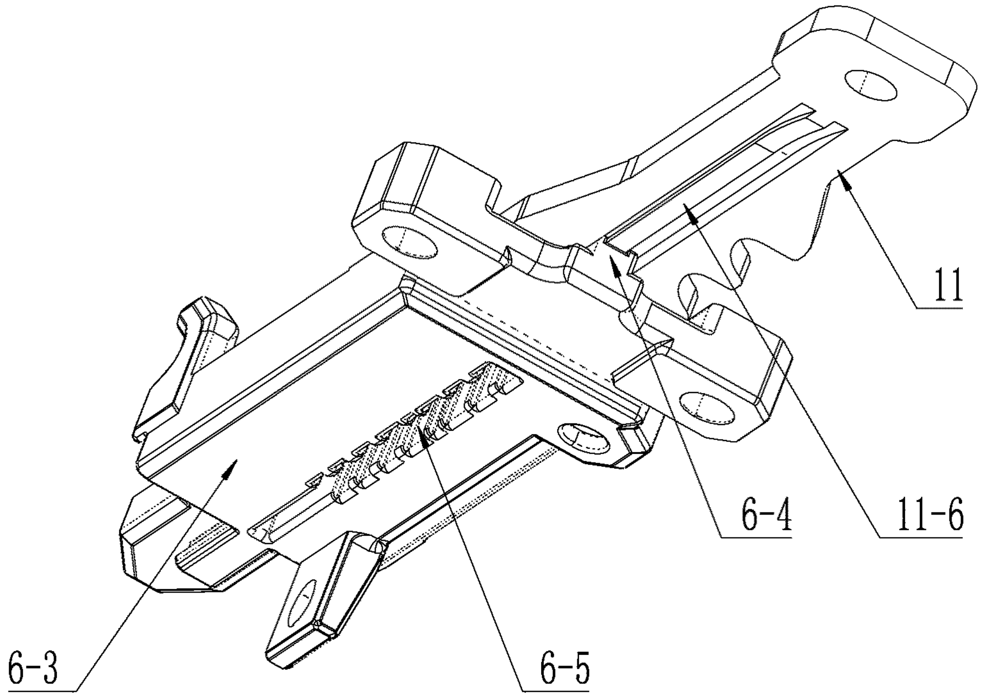
FIG. 10 is a schematic diagram of an installation structure of the punching needle and the lower plate in the present invention.
Figure 11:
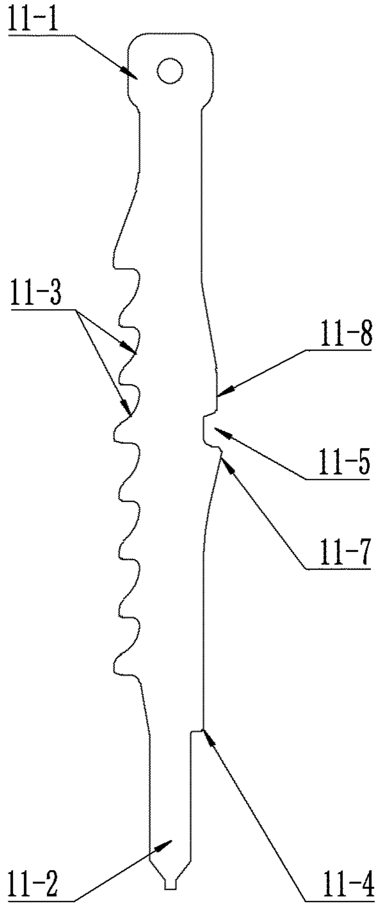
FIG. 11 is a front view of a structure of the punching needle in the present invention.
Figure 12:
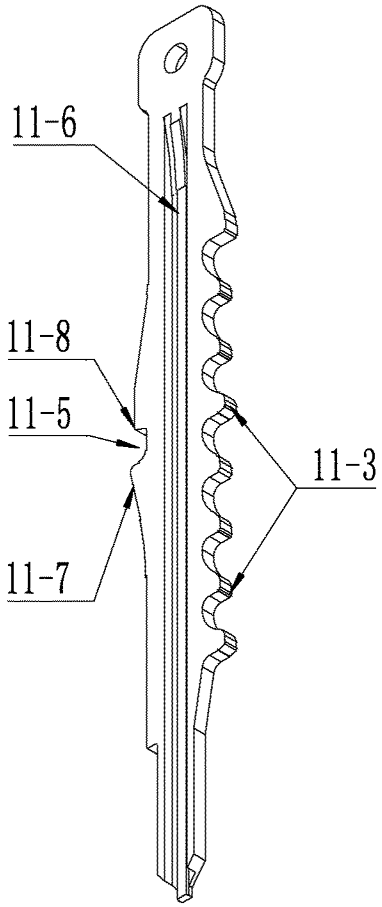
FIG. 12 is a three-dimensional view of the structure of the punching needle in the present invention.
Figure 13:
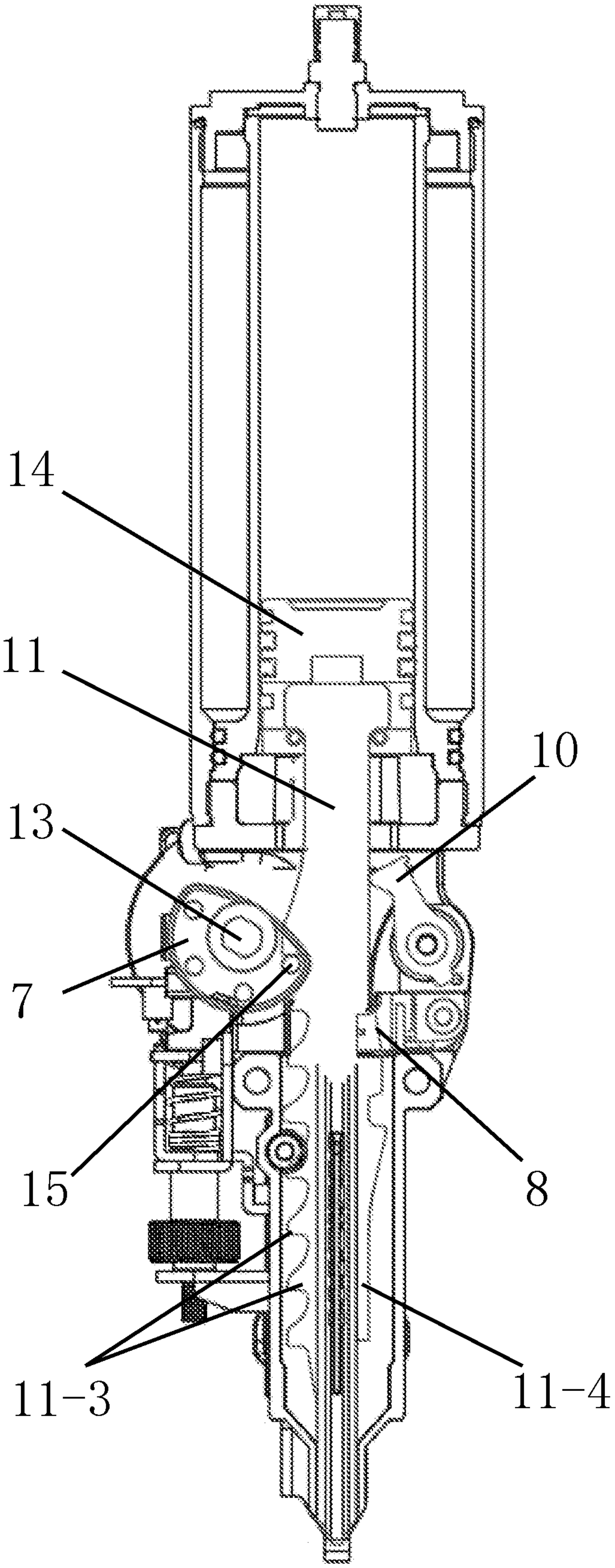
FIG. 13 is a working process diagram 1 of the present invention (initial position).
Figure 18:
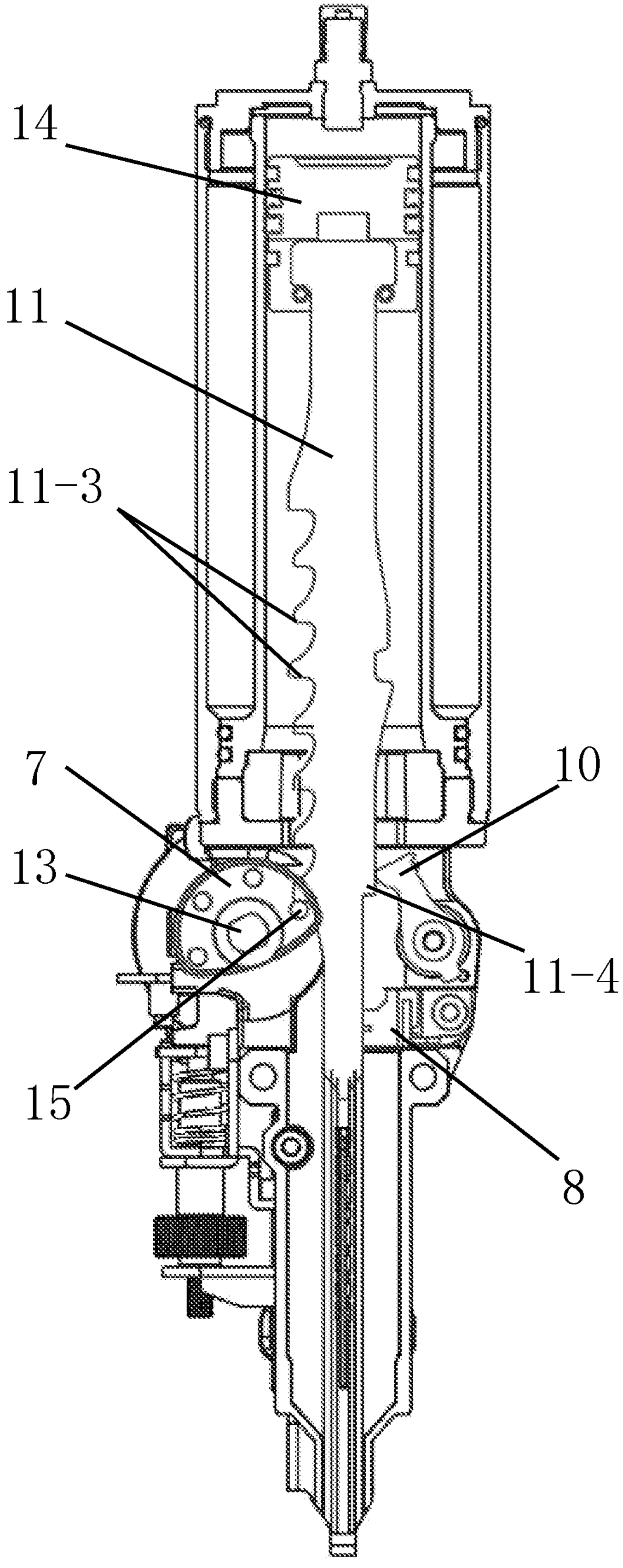
FIG. 18 is a working process diagram 6 of the present invention (energy storage position).

As shown in FIG. 4, a fixed end 11-1 of the punching needle 11 is fixed on a piston 14 of the accumulator 12, and a movable end 11-2 of the punching needle 11 is disposed inside the assembly frame body 6 in a sliding manner to strike a nail inside the assembly frame body 6, so that the nail is shot out from a nail outlet 6-1 of the assembly frame body 6. The punching needle driving cam 7 and the clutch pawl 10 are disposed on two sides of the punching needle 11 separately. With reference to FIGS. 11 and 12, (preferably eight in this embodiment) punching needle teeth 11-3 are disposed at an edge of a side, facing the punching needle driving cam 7, of the punching needle 11, a plurality of (preferably four in this embodiment) cam pins 15 are disposed on the punching needle driving cam 7, and the punching needle driving cam 7 engages with the punching needle teeth 11-3 through the cam pins 15 to drive the punching needle 11 to slide between an initial position (as shown in FIG. 13) and an energy storage position (as shown in FIG. 18). An inductive optocoupler blocking edge 11-4 is disposed at an edge of a side, facing the clutch pawl 10, of the punching needle 11 to selectively block the inductive optocoupler 8 disposed next to the clutch pawl 10. The inductive optocoupler 8 controls start and stop of the motor 3 through electrical signals. When the inductive optocoupler blocking edge 11-4 leaves the inductive optocoupler 8, the inductive optocoupler 8 sends a signal to control braking of the motor 3. The torsion spring 9 is used to twist the clutch pawl 10, so as to ensure that the clutch pawl 10 always slides along the inductive optocoupler blocking edge 11-4. A notch 11-5 is formed on the inductive optocoupler blocking edge 11-4 to fit and clamp the clutch pawl 10.

With reference to FIGS. 7-10, the assembly frame body 6 includes an upper plate 6-2 and a lower plate 6-3, and the punching needle 11 is disposed between the upper plate 6-2 and the lower plate 6-3 in a sliding manner. A boss 6-4 is disposed on an upper surface of the lower plate 6-3 to match a groove 11-6 disposed on a lower surface of the punching needle 11, and the punching needle 11 slides along the boss 6-4 and is guided. A nail inlet 6-5 is disposed on a lower surface of the lower plate 6-3, and the nail inlet 6-5 penetrates the boss 6-4, so that the nail at a top of the nail clip 2 enters the assembly frame body 6 along the nail inlet 6-5.

Figure 14:
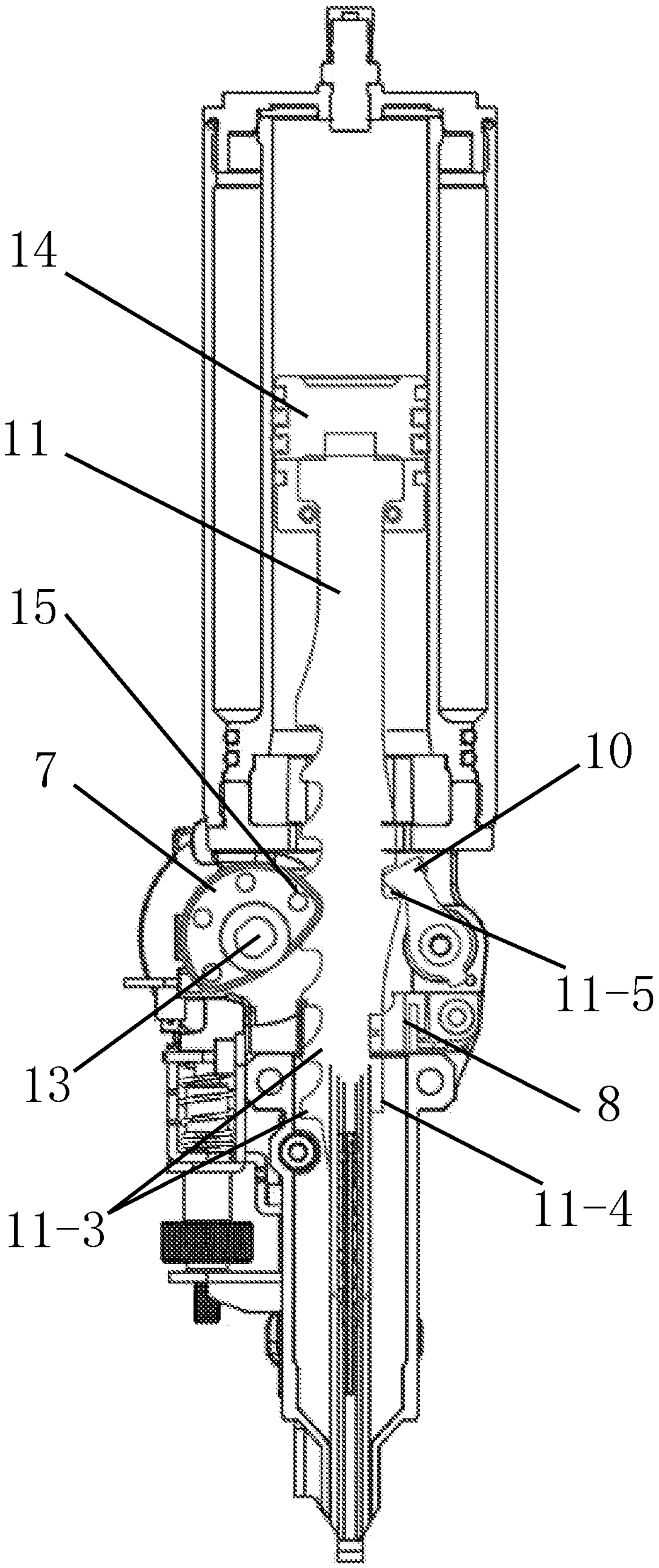
FIG. 14 is a working process diagram 2 of the present invention (middle energy storage position).
Figure 15:
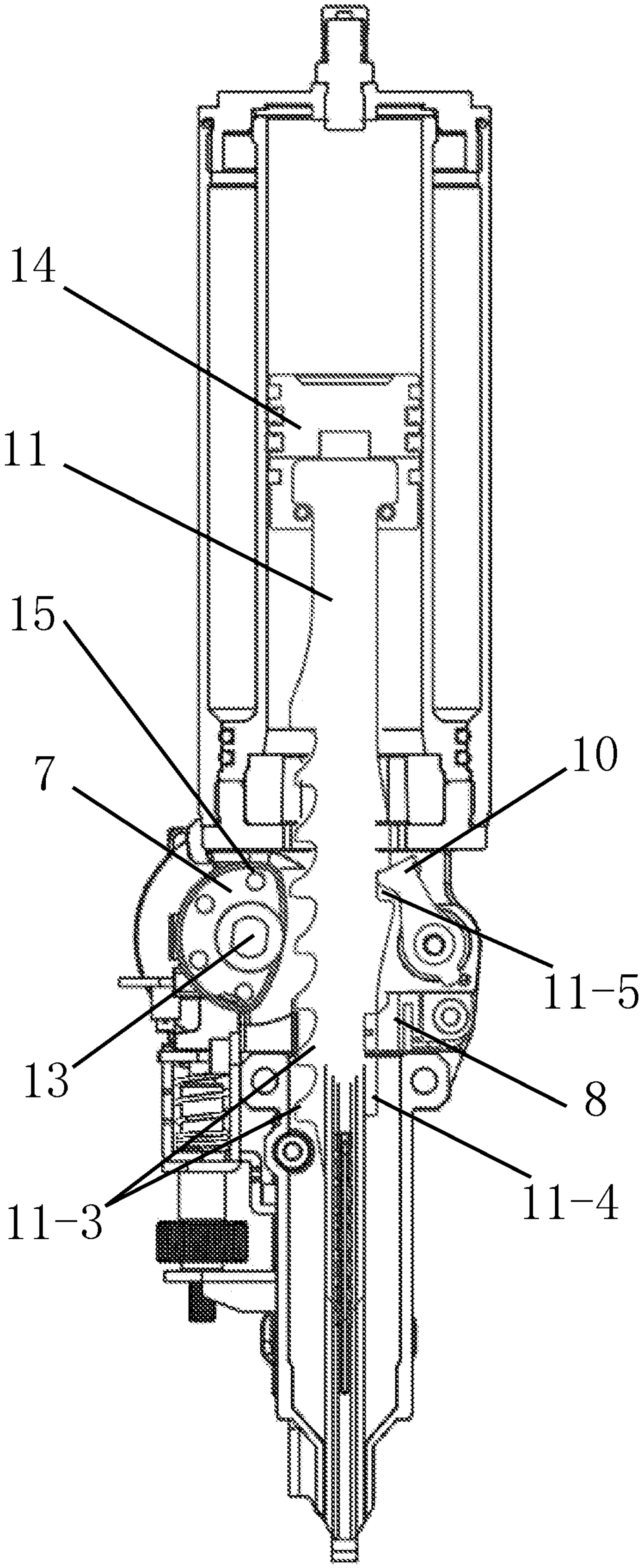
FIG. 15 is a working process diagram 3 of the present invention.

As shown in FIG. 14, when the punching needle 11 slides to a middle energy storage position between the initial position and the energy storage position, the four cam pins 15 of the punching needle driving cam 7 all complete engaging transmission with one punching needle tooth 11-3, the last cam pin 15 of the punching needle driving cam 7 happens to disengage from the punching needle tooth 11-3, the clutch pawl 10 is just clipped into the notch 11-5, and the punching needle 11 cannot move towards its active end 11-2 (namely, downwards) under the action of the notch 11-5, as shown in FIG. 15.

Figure 17:
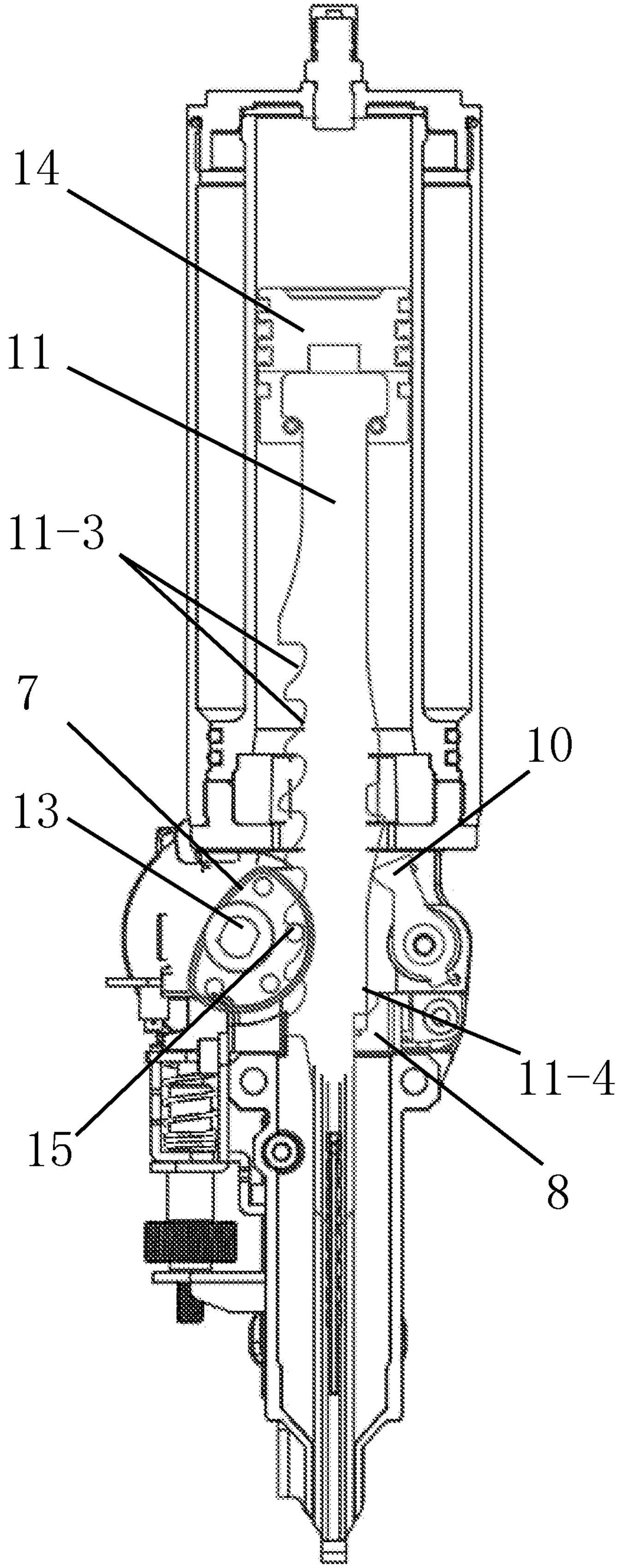
FIG. 17 is a working process diagram 5 of the present invention.

With reference to FIG. 17, when the inductive optocoupler blocking edge 11-4 completely leaves the inductive optocoupler 8, the inductive optocoupler 8 sends a signal to control the motor 3 to start braking and stop rotating.

Figure 20:
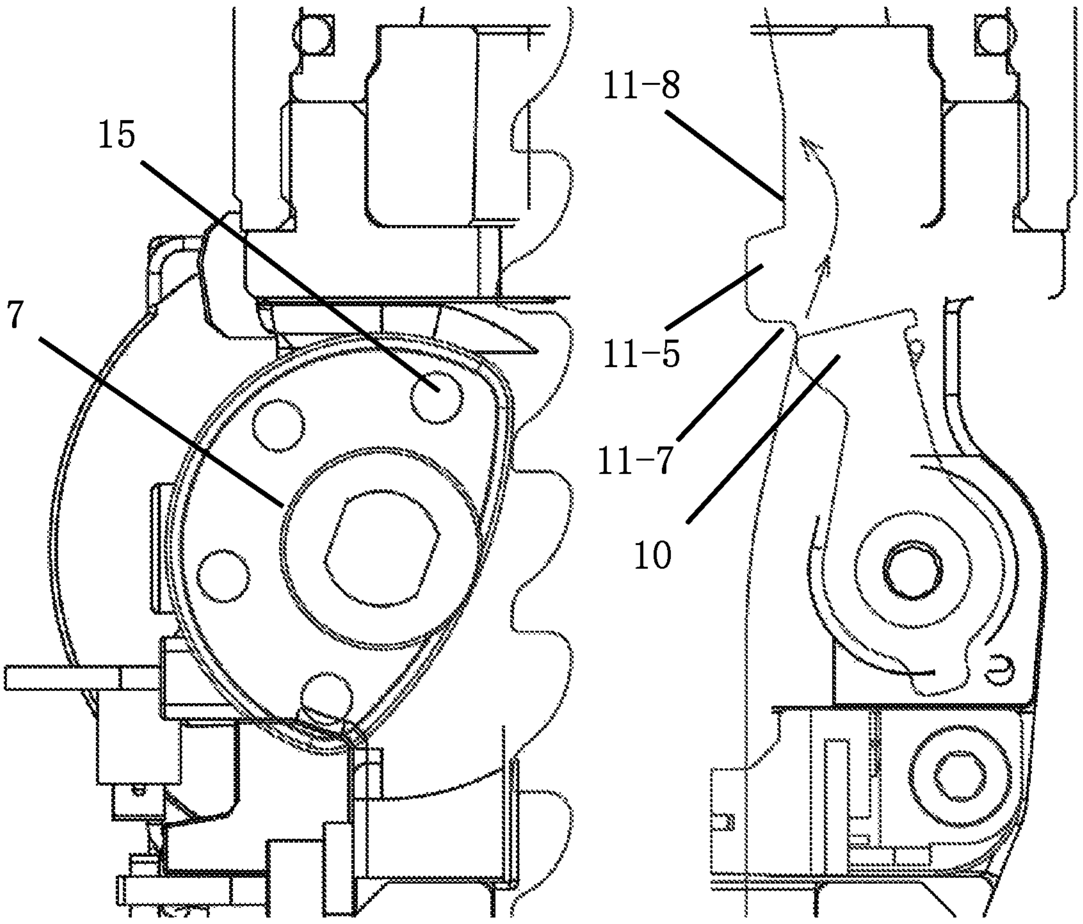
FIG. 20 is a schematic diagram of a movement trajectory of a clutch pawl.

As shown in FIGS. 11 and 12, a left jump platform 11-7 is disposed on the inductive optocoupler blocking edge 11-4 on a side, close to the movable end 11-2, of the notch 11-5, a right jump platform 11-8 is disposed on the inductive optocoupler blocking edge 11-4 on a side, close to the fixed end 11-1, of the notch 11-5, and a height of the left jump platform 11-7 is greater than that of the right jump platform 11-8. As shown in FIG. 20, when the clutch pawl 10 moves away from the left jump platform 11-7 towards the notch 11-5, the clutch pawl 10 crosses the notch 11-5 in an arc trajectory and lands on the right jump platform 11-8.

Preferably, the accumulator 12 is a spring or compressed gas, and compressed gas is preferred in this embodiment.

Figure 16:
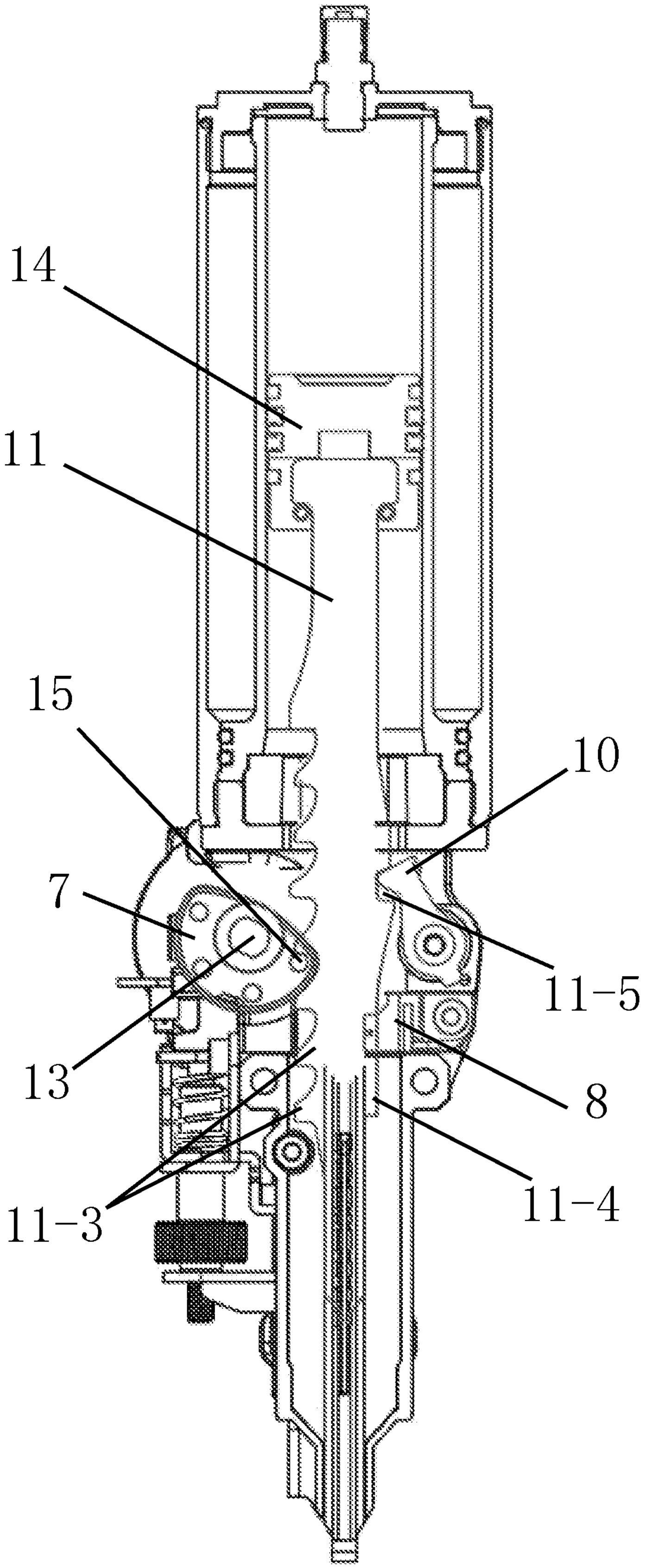
FIG. 16 is a working process diagram 4 of the present invention.
Figure 19:
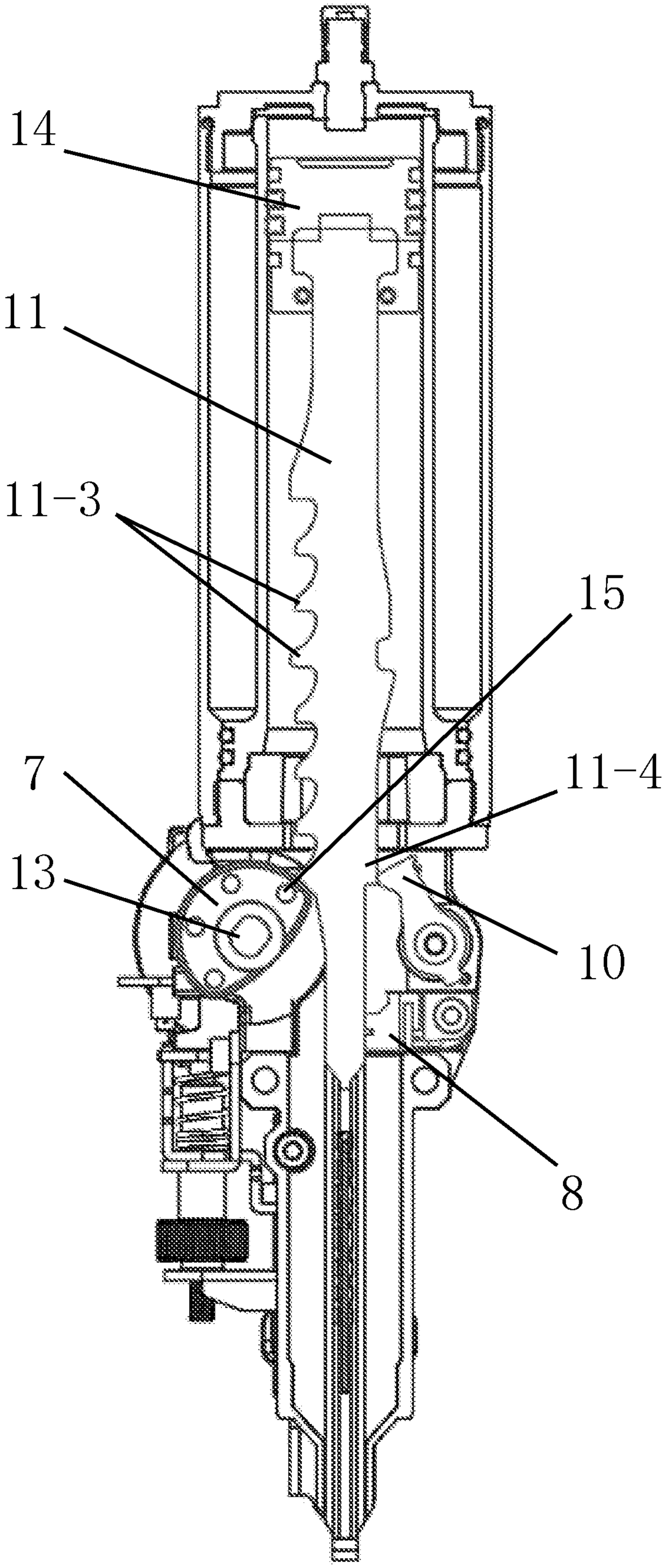
FIG. 19 is a working process diagram 7 of the present invention.

A working process of the present invention is as follows: As shown in FIG. 13, the punching needle 11 is in its initial position after previous punching, and the movable end 11-2 extends out of the nail outlet 6-1. At this time, the motor 3 starts to rotate, and the camshaft 13 and the punching needle driving cam 7 are driven to rotate counterclockwise. As the punching needle driving cam 7 rotates, the four cam pins 15 thereon gradually complete engaging transmission with the punching needle teeth 11-3 to drive the punching needle 11 to move upwards, and the accumulator 12 is compressed through the piston 14 to store energy. After all the four cam pins 15 complete engaging transmission with one punching needle tooth 11-3, as shown in FIG. 14, the last cam pin 15 of the punching needle driving cam 7 happens to disengage from the punching needle tooth 11-3, and the clutch pawl 10 is just clipped into the notch 11-5. The motor 3 continues to drive the punching needle driving cam 7 to rotate, as shown in FIG. 15, the punching needle 11 cannot move towards its active end 11-2 (namely, downwards) under the action of the notch 11-5, and the punching needle 11 remains in the middle energy storage position. The motor 3 continuously drives the punching needle driving cam 7 to rotate, as shown in FIGS. 16, 17, and 18, the four cam pins 15 complete engaging transmission with the punching needle teeth 11-3 again, the punching needle 11 is driven to continue to move upwards, and the piston 14 continues to compress the accumulator 12 for energy storage. In this process, the inductive optocoupler blocking edge 11-4 of the punching needle 11 gradually leaves the inductive optocoupler 8, as shown in FIG. 17. At this time, the inductive optocoupler 8 sends a signal to control the motor 3 to start braking and stop rotating. After the motor 3 stops completely, the last cam pin 15 just completes engagement with the punching needle tooth 11-3, as shown in FIG. 18, and the punching needle 11 arrives at the energy storage position. In the presence of the one-way bearing 5, the punching needle driving cam 7 may be prevented from rotating clockwise, so that the punching needle 11 remains stationary with potential energy. When a nail needs to be punched, the trigger 16 is pulled, and the motor 3 drives the punching needle driving cam 7 to rotate counterclockwise, so that the last cam pin 15 instantly disengages from the punching needle tooth 11-3 (as shown in FIG. 19), and the accumulator 12 and the piston 14 push the punching needle 11 and the nail to move downwards at a high speed. During the movement of the punching needle 11, the clutch pawl 10 jumps over the notch 11-5 in an arc trajectory (as shown in FIG. 20) under the action of the left jump platform 11-7, so as to ensure that the punching needle 11 strikes the nail into an object such as a board without obstacles.

It may be understood that, for those skilled in the art, equivalent substitutions or modifications of the technical solution and inventive concept of the present invention should fall within the protection scope of the appended claims of the present invention.

What is claimed is:

1. A nail gun punching needle clutch mechanism disposed inside a nail gun shell on which a nail clip, an assembly frame body, and an accumulator are fixed, the nail clip being disposed below the assembly frame body to feed nails into the assembly frame body, and the accumulator being disposed behind the assembly frame body, wherein a clutch mechanism comprises a punching needle driving cam, an inductive optocoupler, a torsion spring, a clutch pawl, and a punching needle; a motor is disposed in the nail gun shell, the motor is triggered to rotate by a trigger on the nail gun shell, the motor is connected to a driving camshaft through a gearbox, and the driving camshaft is used to drive the punching needle driving cam to rotate; a fixed end of the punching needle is fixed on a piston of the accumulator, and a movable end of the punching needle is disposed inside the assembly frame body in a sliding manner to strike a nail inside the assembly frame body, so that the nail is shot out from a nail outlet of the assembly frame body; the punching needle driving cam and the clutch pawl are disposed on two sides of the punching needle separately; punching needle teeth are disposed at an edge of a side, facing the punching needle driving cam, of the punching needle, a plurality of cam pins are disposed on the punching needle driving cam, and the punching needle driving cam engages with the punching needle teeth through the plurality of cam pins to drive the punching needle to slide between an initial position and an energy storage position; an inductive optocoupler blocking edge is disposed at an edge of a side, facing the clutch pawl, of the punching needle to selectively block the inductive optocoupler disposed next to the clutch pawl, and the inductive optocoupler controls start and stop of the motor through electrical signals; the torsion spring is used to twist the clutch pawl, so that the clutch pawl slides along the inductive optocoupler blocking edge; and a notch is formed on the inductive optocoupler blocking edge to fit and clamp the clutch pawl.

2. The nail gun punching needle clutch mechanism according to claim 1, wherein the assembly frame body comprises an upper plate and a lower plate, and the punching needle is disposed between the upper plate and the lower plate in a sliding manner.

3. The nail gun punching needle clutch mechanism according to claim 2, wherein a boss is disposed on an upper surface of the lower plate to match a groove disposed on a lower surface of the punching needle, and the punching needle slides along the boss and is guided; a nail inlet is disposed on a lower surface of the lower plate, and the nail inlet penetrates the boss, so that the nail at a top of the nail clip enters the assembly frame body along the nail inlet.

4. The nail gun punching needle clutch mechanism according to claim 1, wherein when the punching needle slides to a middle energy storage position between the initial position and the energy storage position, the plurality of cam pins of the punching needle driving cam happen to disengage from the punching needle teeth, and the clutch pawl is just clipped into the notch to limit the movement of the punching needle towards an active end of the punching needle.

5. The nail gun punching needle clutch mechanism according to claim 1, wherein when the inductive optocoupler blocking edge completely leaves the inductive optocoupler, the inductive optocoupler sends a signal to control the motor to stop rotating.

6. The nail gun punching needle clutch mechanism according to claim 1, wherein a left jump platform is disposed on the inductive optocoupler blocking edge on a side, close to the movable end, of the notch, a right jump platform is disposed on the inductive optocoupler blocking edge on a side, close to the fixed end, of the notch, and a height of the left jump platform is greater than that of the right jump platform.

7. The nail gun punching needle clutch mechanism according to claim 6, wherein when the clutch pawl moves away from the left jump platform towards the notch, the clutch pawl crosses the notch in an arc trajectory and lands on the right jump platform.

8. The nail gun punching needle clutch mechanism according to claim 1, wherein the accumulator is a spring or compressed gas.

9. The nail gun punching needle clutch mechanism according to claim 1, wherein the driving camshaft is sleeved with a one-way bearing to ensure that the punching needle driving cam rotates in one direction.

* * * * *